United States Patent
Yoon et al.

(10) Patent No.: US 10,261,675 B2
(45) Date of Patent: Apr. 16, 2019

(54) METHOD AND APPARATUS FOR DISPLAYING SCREEN IN DEVICE HAVING TOUCH SCREEN

(71) Applicant: Samsung Electronics Co., Ltd., Suwon-si, Gyeonggi-do (KR)

(72) Inventors: Bongno Yoon, Suwon-si (KR); Hyunseok Oh, Seoul (KR); Sangil Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 14/775,091

(22) PCT Filed: Mar. 20, 2014

(86) PCT No.: PCT/KR2014/002367
§ 371 (c)(1),
(2) Date: Sep. 11, 2015

(87) PCT Pub. No.: WO2014/148850
PCT Pub. Date: Sep. 25, 2014

(65) Prior Publication Data
US 2016/0026334 A1    Jan. 28, 2016

(30) Foreign Application Priority Data

Mar. 22, 2013  (KR) .......................... 10-2013-0030921

(51) Int. Cl.
G06F 3/041        (2006.01)
G06F 3/0484       (2013.01)
G06F 3/0488       (2013.01)

(52) U.S. Cl.
CPC ........ *G06F 3/04842* (2013.01); *G06F 3/0488* (2013.01); *G06F 3/0418* (2013.01);
(Continued)

(58) Field of Classification Search
CPC .... G06F 3/044; G06F 3/0416; G06F 3/04883; G06F 3/0488; G06F 3/0418;
(Continued)

(56) References Cited

U.S. PATENT DOCUMENTS

2004/0059699 A1*  3/2004  Evans ............... G06F 17/30716
2005/0114441 A1*  5/2005  Forrester ............ G06Q 30/0603
                                                    709/203

(Continued)

FOREIGN PATENT DOCUMENTS

EP          2 163 975 A2     3/2010
KR     10-2010-0088647 A     8/2010
(Continued)

*Primary Examiner* — Sanjiv D. Patel
(74) *Attorney, Agent, or Firm* — Jefferson IP Law, LLP

(57) ABSTRACT

The present invention relates to a method and an apparatus for displaying a screen in a device having a touch screen. The method for displaying a screen in a device having a touch screen, according to the present invention, comprises: a detection step of detecting the approach of a touch means on the touch screen; and a displaying step of magnifying at least one input item corresponding to a position at which the approach has been detected, among a plurality of input items displayed on the touch screen, and displaying the magnified input item. According to the present invention, input errors can be reduced.

12 Claims, 11 Drawing Sheets

(52) U.S. Cl.
CPC .............. *G06F 2203/04104* (2013.01); *G06F 2203/04803* (2013.01); *G06F 2203/04806* (2013.01)

(58) Field of Classification Search
CPC ......... G06F 3/0421; G06F 2203/04104; G06F 3/042; G06F 3/0412; G06F 2203/04101; G06F 3/041–3/048; G06F 3/04817; G06F 3/04842; G06F 3/0481; G06F 3/04886; G06F 2203/04806
See application file for complete search history.

(56) References Cited

U.S. PATENT DOCUMENTS

| | | | | |
|---|---|---|---|---|
| 2006/0267953 | A1* | 11/2006 | Peterson, Jr. | G06F 3/0418 345/173 |
| 2009/0122007 | A1* | 5/2009 | Tsuzaki | G06F 3/0412 345/156 |
| 2009/0225100 | A1 | 9/2009 | Lee et al. | |
| 2009/0251422 | A1* | 10/2009 | Wu | G06F 3/04886 345/173 |
| 2009/0315848 | A1* | 12/2009 | Ku | G06F 3/0416 345/173 |
| 2010/0026723 | A1* | 2/2010 | Nishihara | G06F 3/04886 345/671 |
| 2010/0066695 | A1 | 3/2010 | Miyazaki | |
| 2010/0156807 | A1* | 6/2010 | Stallings | G06F 3/04886 345/173 |
| 2010/0180235 | A1* | 7/2010 | Griffin | G06F 3/0236 715/841 |
| 2011/0175816 | A1 | 7/2011 | Shin | |
| 2011/0285657 | A1* | 11/2011 | Shimotani | G06F 3/0416 345/173 |
| 2011/0296346 | A1* | 12/2011 | Chen | G06F 3/04817 715/811 |
| 2012/0310994 | A1* | 12/2012 | Wionzek | G06F 3/0482 707/803 |
| 2015/0077140 | A1* | 3/2015 | Chu | G06F 3/044 324/658 |

FOREIGN PATENT DOCUMENTS

| | | |
|---|---|---|
| WO | 2011/016664 A2 | 2/2011 |
| WO | 2011/078632 A2 | 6/2011 |
| WO | 2013/039358 A1 | 3/2013 |

\* cited by examiner

METHOD AND APPARATUS FOR DISPLAYING SCREEN IN DEVICE HAVING TOUCH SCREEN

TECHNICAL FIELD

The present invention relates to a device having a touch screen, and more particularly, to a method and an apparatus for displaying a screen in a device having a touch screen.

BACKGROUND ART

The current trend in electronic device evolution is towards the development of a multimedia device which is able to provide various optional services such as an electronic organizer function, a game function, a schedule management function, and the like. As the electronic device provides various optional services as described above, a user interface, which can more conveniently manage and use various types of optional services, is indispensable.

In the current digital device represented by a Smart phone, although the pixel density has been increased in order to implement a high-resolution of a screen, there is a tendency to restrict the expansion of screen size so as to achieve the convenient mobility of a device. Accordingly, in most current digital devices adopting a touch panel (or touch screen) type in which desired information is input by directly touching a screen using a finger or a specific pen by a user, an area to recognize the user's touch is gradually decreased, so that the possibility of the occurrence of an input error is increased.

Accordingly, there is a need for a method for reducing input errors in a device having a touch screen.

DISCLOSURE OF INVENTION

The present invention has been made in view of the above problems, and provides a method and apparatus for magnifying and displaying a certain number of input items corresponding to a position at which touch sensitivity is increased, when a touch means approaches within a certain distance to a touch screen, in a device having the touch screen.

In accordance with an aspect of the present invention, a method for displaying a screen in a device having a touch screen includes: a detection step of detecting an approach of a touch means on the touch screen; and a displaying step of magnifying and displaying at least one input item corresponding to a position at which the approach has been detected, among a plurality of input items displayed on the touch screen.

In accordance with another aspect of the present invention, a device having a touch screen includes: the touch screen configured to detect an approach or a touch input of a touch means and display an input item; and a controller configured to magnify and display at least one input item corresponding to a position at which the approach has been detected, among a plurality of input items displayed on the touch screen, when detecting the approach of the touch means on the touch screen.

BRIEF DESCRIPTION OF DRAWINGS

The objects, features and advantages of the present invention will be more apparent from the following detailed description in conjunction with the accompanying drawings, in which.

MODE FOR THE INVENTION

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The term 'device' used in the following description may mean any electronic device having a touch screen such as a mobile terminal, a camera, a MP3 player, a tablet personal computer (PC), and the like, but not necessarily limited to these devices.

A touch means of the present invention may mean an input means for the touch screen, and may include user's finger, a touch pen, and the like.

An input item of the present invention (input item) may mean a unit for receiving a user input, performing a specific function, or displaying content. The input item may be displayed as an icon displayed as arbitrary shape, form, color or a combination thereof or may be displayed as a title describing specific contents. The input item may have arbitrary area size for receiving user input.

As described above, in most cases of a device having a touch screen, an input error may occur due to the limited size of the touch screen when a user desires to input letters or numbers during writing MMS/SMS. In addition, when a user desires to select the contents (e.g., the text) registered in a newspaper article or a community site on a web site by another user, a correct touch input for a corresponding part may not be accomplished, so that the movement to a desired list may not be achieved.

Figure 1:
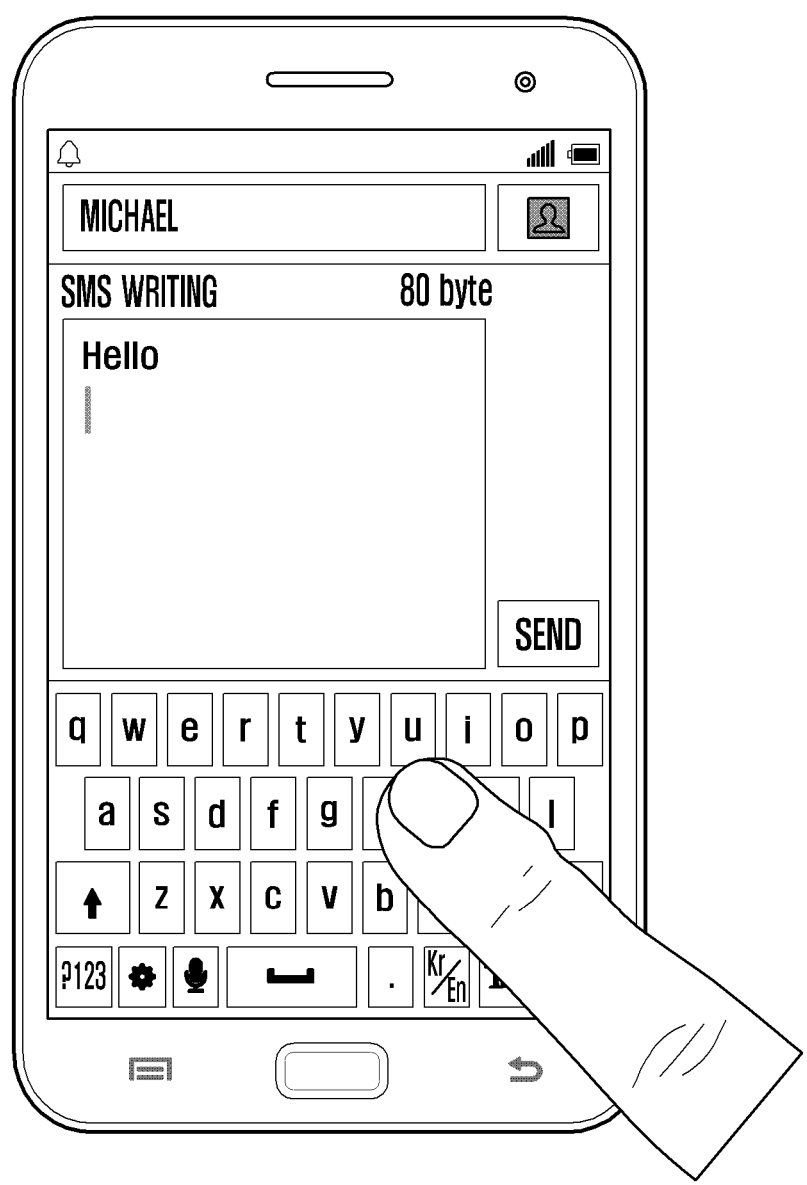
FIG. 1 is a diagram illustrating a case of occurrence of an input error when a user desires to input a character or a text.
Figure 2:
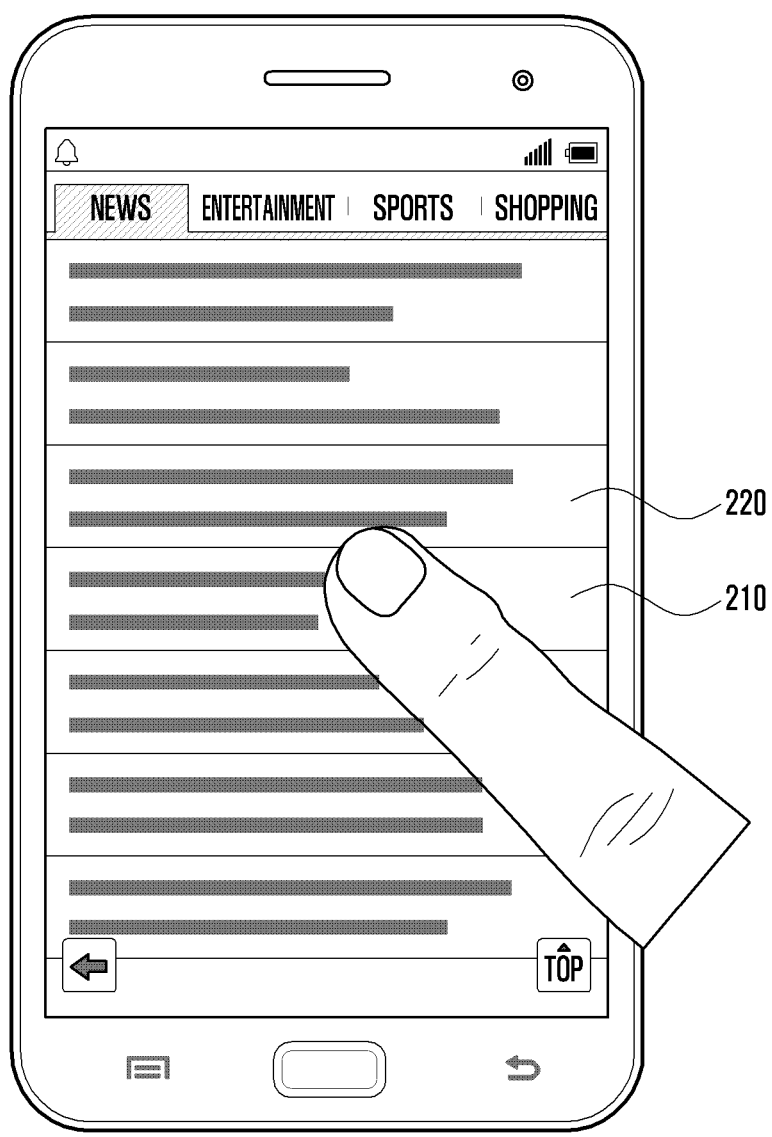
FIG. 2 is a diagram illustrating a case where input error occurs when a user desires to select specific contents such as news articles.

FIG. 1 and FIG. 2 are diagrams illustrating the problems described above.

FIG. 1 is a diagram illustrating a case where input error occurs when a user desires to input a character or a text.

As shown in FIG. 1, in the case of a device having a touch screen, when displaying all of the English alphabet, the area allocated to input the English alphabet eventually becomes smaller due to the limited size of the touch screen. The same applies to the case of number or symbol.

When a touch means for inputting a specific character is user's finger, if the fingertip is similar to or rather larger than the area allocated to input the English alphabet, the user is not able to precisely input a desired character.

For example, as shown in FIG. 1, when a user desires to input alphabet 'J' when writing SMS/MMS, it may happen that an unwanted character may be input as the 'H' or the 'k' located next to a corresponding alphabet is touched wrong.

FIG. 2 is a diagram illustrating a case where input error occurs when a user desires to select specific contents such as news articles.

As shown in FIG. 2, when the user verifies the newspaper article in the Internet portal site, for example, although the user desires to click and read the article indicated in 210, the article indicated in 220 which is located on the upper side of the desired article may be clicked due to the touch input error.

Such an error occurs when the size of each character (alphabet) or the area allocated for the input on each article is not large enough in comparison with the size of the touch means (finger).

This, as described above, may be understood as a side effect which occurs in order to display much more information in a limited display space.

In addition, when using a specific pen instead of a finger in order to minimize the input error, if a user clicks articles or writes a text by using an electronic device in a shaking vehicle (bus, subway, etc.), the effect of using a specific pen may be reduced.

The present invention has been made in view of the above problems, and provides a method for magnifying and displaying a certain number of input items corresponding to a position at which touch sensitivity is increased, when a touch means approaches within a certain distance to a touch screen, in a device having the touch screen.

In more detail, in order to control the touch sensitivity of the capacitive touch panel and to implement a screen magnification technology, when it is recognized that a touch means (a finger or a specific pen, etc.) approaches within a certain distance to a touch screen to accomplish a touch, a specific part of the screen is magnified and displayed on a full screen.

To this end, maximum two or three items of a point which is desired to be touched or clicked and the perimeter (up, down, left, right) of the point are magnified and displayed on a full display. Accordingly, the input error may be dropped to nearly 0%, and the ease of use for user may be maximized. In addition, when an input item desired by the user is not displayed on the touch screen, according to the touch movement, the magnified screen may be move to up, down, left, and right.

Figure 3:
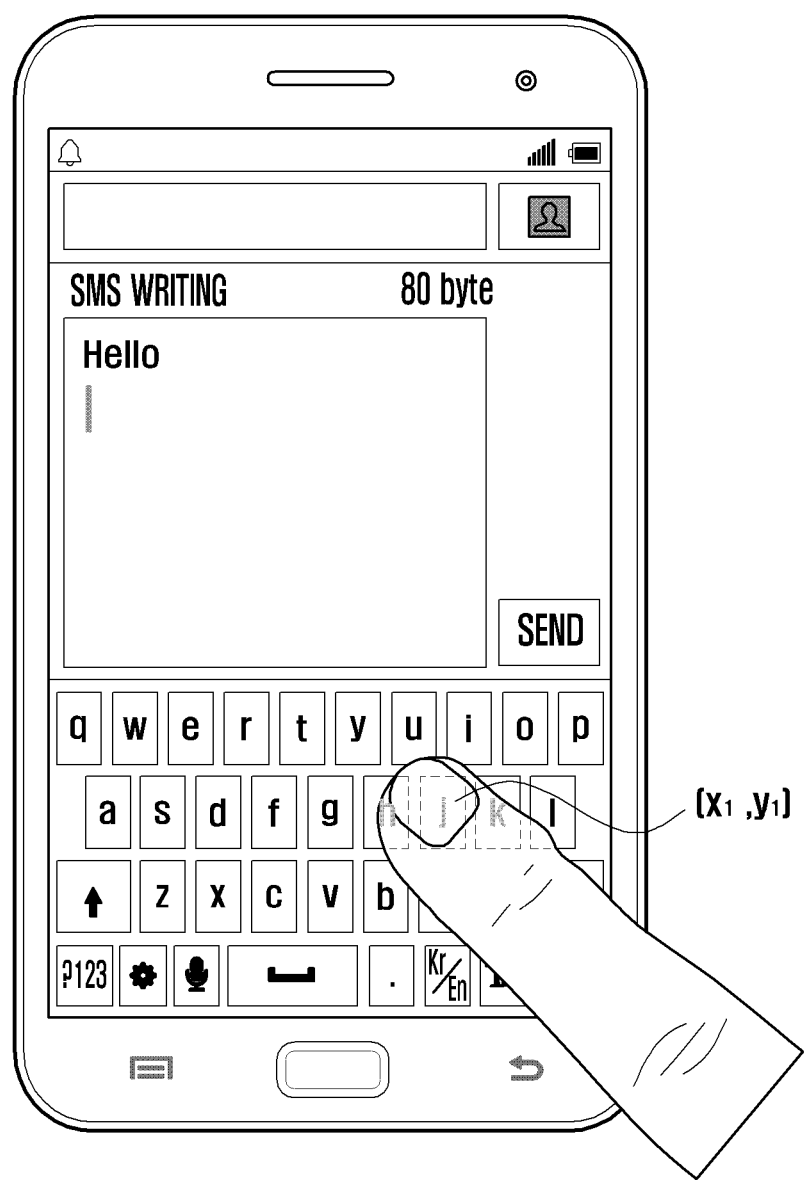
FIG. 3 and FIG. 4 are diagrams illustrating a method of magnifying and displaying an input item on a touch screen when a user desires to input a character or a text according to an embodiment of the present invention.
Figure 4:
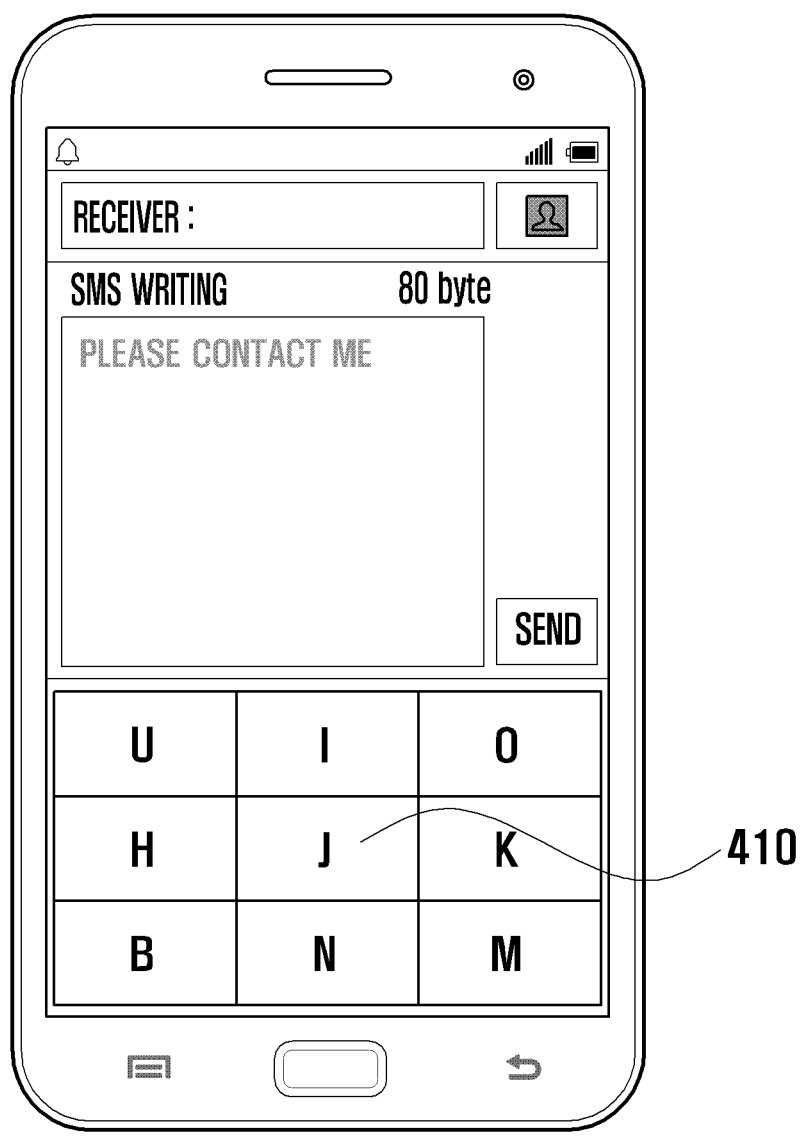

FIG. 3 and FIG. 4 are diagrams illustrating a method of magnifying and displaying an input item on a touch screen when a user desires to input a character or a text.

First, similarly to FIG. 1, in FIG. 3, it is assumed that a user desires to input the alphabet 'J' when writing SMS/MMS.

In this case, the device according to an embodiment of the present invention may detect that a touch sensitivity increases in a specific position of the touch screen. In addition, when the touch sensitivity for a specific position is higher than a set threshold, the device obtains corresponding position information. For example, the device may obtain information on the position having the touch sensitivity higher than a set threshold as a coordinate value such as (x1, y1).

The device may decide an item corresponding to the position of the (x1, y1) as a target item. The target item is an item that is estimated to be touched by the user. The estimation may be based on the touch sensitivity, and the estimation may be accomplished with respect to the item corresponding to the position having the highest touch sensitivity on the touch screen.

In an embodiment of FIG. 3, the target item corresponding to the position (x1, y1) having the highest touch sensitivity may correspond to 'j' among the English alphabetic characters. Then, the device may set a plurality of candidate items adjacent to the target item. The candidate item may be defined as an item which is magnified and displayed on the touch screen together with the target item. The number of candidate items may be varied depending on the size of the touch screen, the currently used application (whether it is the web browser or the word processing application, or the like), the type of the input item (the character, the number, the symbol, the title on HTTP, and the like), and the like, but it is not necessarily limited to a specific number.

In an embodiment of FIG. 3, since the input item is English alphabetic character, the candidate items may be defined as the adjacent items which surround the target item in up, down, left, and right sides.

When the candidate item is determined through the above process, the device may magnify the candidate item and display it on the touch screen as shown in FIG. 4. As shown in FIG. 4, it can be seen that the area 410 allocated to the character 'j' that the user desired to touch is wider than the area shown in FIG. 1 and FIG. 3.

Figure 5:
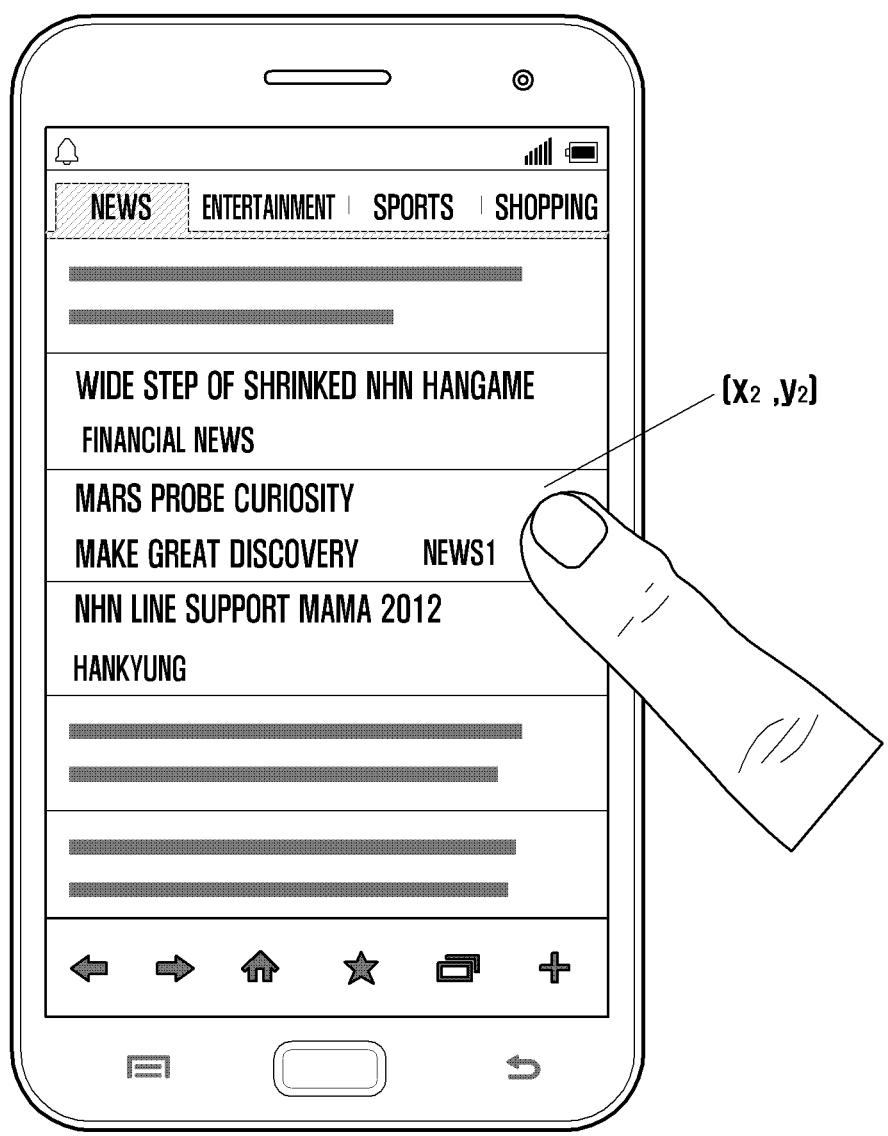
FIG. 5 and FIG. 6 are diagrams illustrating a method of magnifying and displaying an input item on a touch screen according to an embodiment of the present invention when a user verifies newspaper article in an Internet portal site according to an embodiment of the present invention.
Figure 6:
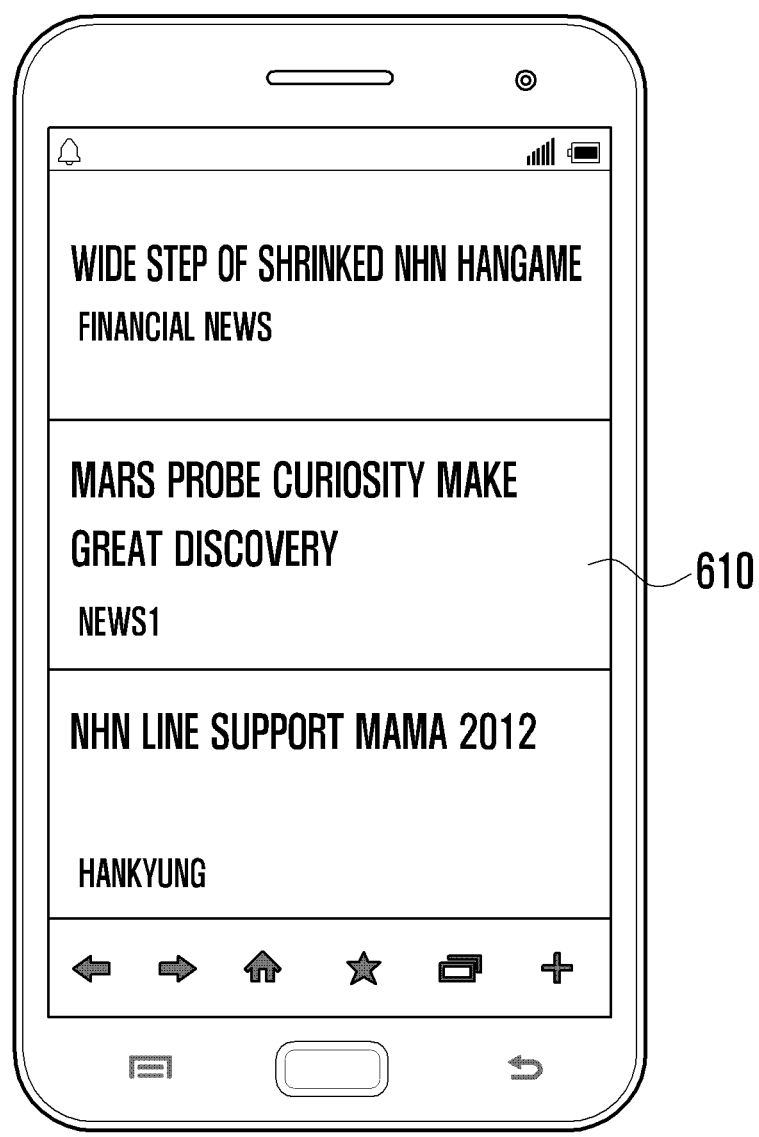

FIG. 5 and FIG. 6 are diagrams illustrating a method of magnifying and displaying an input item on a touch screen according to an embodiment of the present invention when a user verifies newspaper article in an Internet portal site according to an embodiment of the present invention.

In FIG. 5, it is assumed that the user selects specific contents such as news articles.

Similarly, the device according to an embodiment of the present invention detects that the touch sensitivity increases in a specific position of the touch screen. In addition, when the touch sensitivity for a specific position is higher than a set threshold, the device obtains corresponding position information. For example, the device may obtain information on the position having the touch sensitivity higher than a set threshold as a coordinate value such as (x2, y2).

The device may decide an item corresponding to the position of the (x2, y2) as a target item. The target item is an item that is estimated to be touched by the user. The estimation may be based on the touch sensitivity, and the estimation may be accomplished with respect to the item corresponding to the position having the highest touch sensitivity on the touch screen.

In an embodiment of FIG. 5, the target item corresponding to the position (x2, y2) having the highest touch sensitivity is news article with the title of 'Mars Probe . . . '. Then, the device may set a plurality of candidate items adjacent to the target item. The candidate item may be defined as an item which is magnified and displayed on the touch screen together with the target item. The number of candidate items may be varied depending on the size of the touch screen, the currently used application (whether it is the web browser or the word processing application, or the like), the type of the input item (the character, the number, the symbol, the title on HTTP, and the like), and the like, but it is not necessarily limited to a specific number.

In an embodiment of FIG. 5, since the input item is news article, the candidate items may be defined as a preset number of items located in the upper and lower directions with respect to the target item.

When the candidate item is determined through the above process, the device may magnify the candidate item and display it on the touch screen as shown in FIG. 6. As shown in FIG. 6, it can be seen that the area 610 allocated to the news article 'Mars Probe . . . ' that the user desired to touch is wider than the area shown in FIG. 1 and FIG. 3.

Accordingly, it is possible to reduce user's touch input error on a device having a touch screen.

Figure 7:
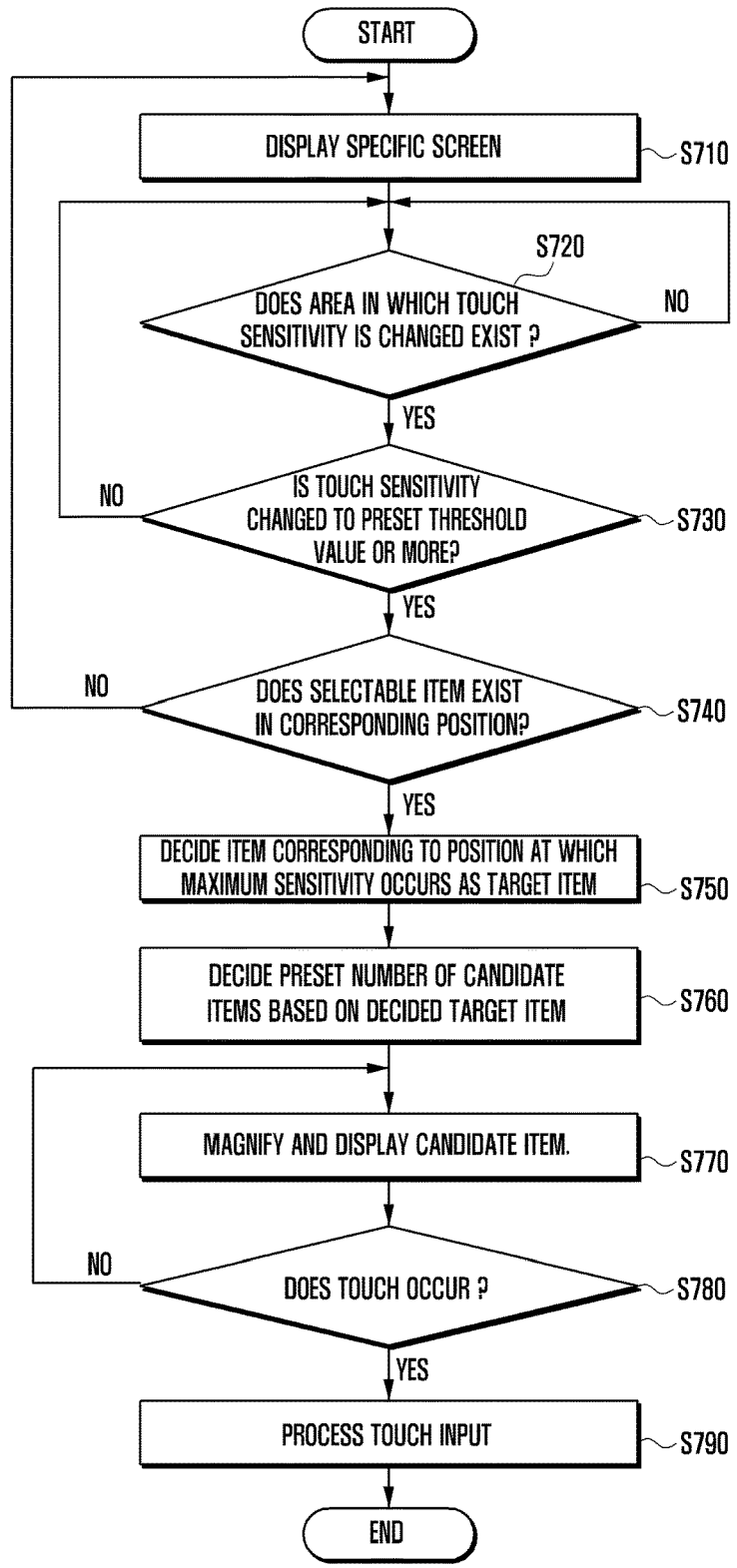
FIG. 7 is a flowchart illustrating a process of displaying a screen of a device according to an embodiment of the present invention.

FIG. 7 is a flowchart illustrating a process of displaying a screen of a device according to an embodiment of the present invention.

First, at step S710, the device may display a specific screen on a touch screen. The specific screen may include a screen to which a user inputs character, number, symbol, or the like in order to write SMS/MMS or which selects specific contents to execute corresponding contents or to display the contents.

In addition, at step S720, the device may determine whether an area in which the touch sensitivity is changed exists on the touch screen. When a touch means for inputting a touch on the touch screen approaches the touch screen, the touch sensitivity for a specific position of the touch screen corresponding to the approach position is changed.

However, when an area in which the touch sensitivity is changed exists, the device may proceed to step S730 and may determine whether the touch sensitivity for a corresponding position is changed to a preset threshold value or more.

When the touch sensitivity for a corresponding position is changed to a preset threshold value or more, the device may proceed to step S740 and may determine whether a selectable item exists in a corresponding position. The selectable item may be an item which is based on user's input, and may mean an input item of the present invention.

When the selectable item exists, the device may proceed to step S750 and may obtain position information on a position at which maximum sensitivity occurs. In addition, the device may decide an item corresponding to the position at which the maximum sensitivity occurs as a target item. For example, if the character 'm' is displayed in a position of (X3, Y3) in which the maximum sensitivity occurs, the device may decide the character 'm' as a target item.

In addition, the device may proceed to step S760, and may decide a preset number of candidate items based on the decided target item. The candidate items may be determined as a preset number of the items among the items located in up, down, left, and right directions with respect to the target item, and the method of determining the candidate item may be determined depending on the characteristic of the input item. For example, when the target item is a character, number, symbol, or the like, the candidate item may be determined from among the items located in up, down, left, and right directions with respect to the target item. On the other hand, when the target item is specific content such as a news article, the candidate item may be determined from among the items located in up and down directions with respect to the target item. The above described embodiment is just a simple example, and the present invention does not preclude various embodiments that determine the candidate item based on the target item.

In addition, the device may proceed to step S770, and may magnify the candidate item decided in the previous step to a set size or a set magnification and display the magnified candidate item.

In addition, the device may proceed to step S780 and may determine whether a touch occurs on the touch screen. When a touch occurs, the device may proceed to step S790 and may process the touch as a touch input and process the subsequent procedure. For example, sub-contents may be displayed by inputting a character or by processing the selection of specific contents.

Figure 8:
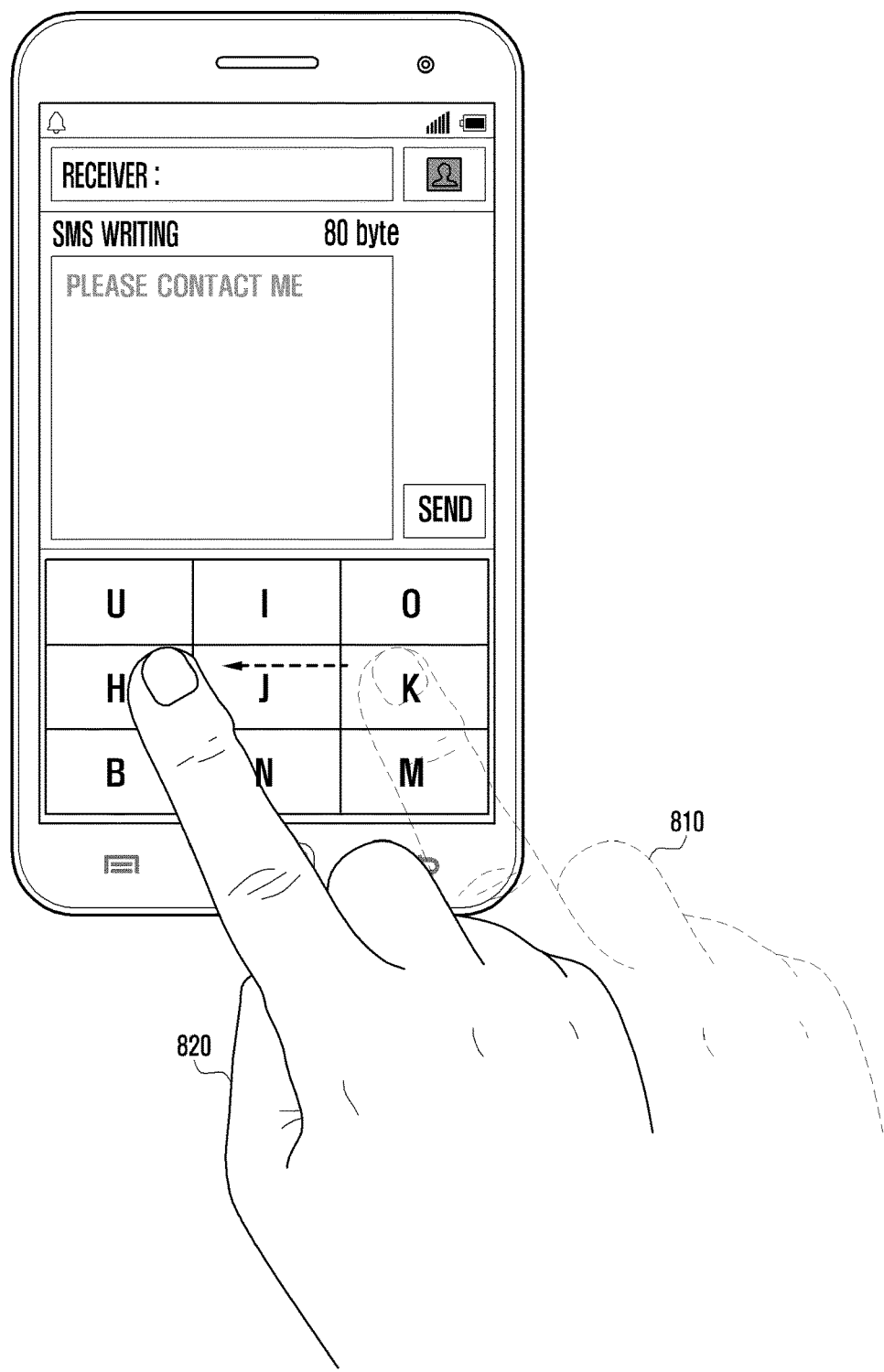
FIG. 8 and FIG. 9 are diagrams illustrating a process of changing a candidate item which is magnified and displayed by moving a touch means after magnifying and displaying the candidate item according to various embodiments of the present invention.
Figure 9:

FIG. 8 and FIG. 9 are diagrams illustrating a process of changing a candidate item which is magnified and displayed by moving a touch means after magnifying and displaying the candidate item according to various embodiments of the present invention.

First, referring to FIG. 8, as described above, when the touch means approaches the input area of the character 'J' on the touch screen as shown in 810, the candidate items adjacent to the 'J' may be magnified and displayed as shown in FIG. 8.

In this case, the user may want to change the desired character (item). In this case, the user may move the touch means from a position 810 to a position 820. For convenience, it is assumed that the position 820 to which the touch means moved corresponds to the input area of the character 'H'.

Then, the device may change the target item from the 'J' to the 'H'. In addition, since the target item is changed to the 'H', the device may reset a plurality of candidate items adjacent to the target item, based on the changed target item.

In addition, the device may magnify the reset candidate item and display on the touch screen. FIG. 9 is a diagram illustrating a case where the reset candidate item is magnified and displayed.

On the other hand, although not shown in FIG. 8 and FIG. 9, in the case in which the candidate item is magnified and displayed in FIG. 8, it is also possible to display a movement key for scrolling or moving a screen in a certain area on the touch screen.

By comparing FIG. 8 with FIG. 9, it can be seen that the target item of FIG. 8 is 'J', but the target item is changed to 'H' in FIG. 9, and it can be seen that the type of the candidate item which is magnified and displayed according to the change of the target item is also changed.

Figure 10:
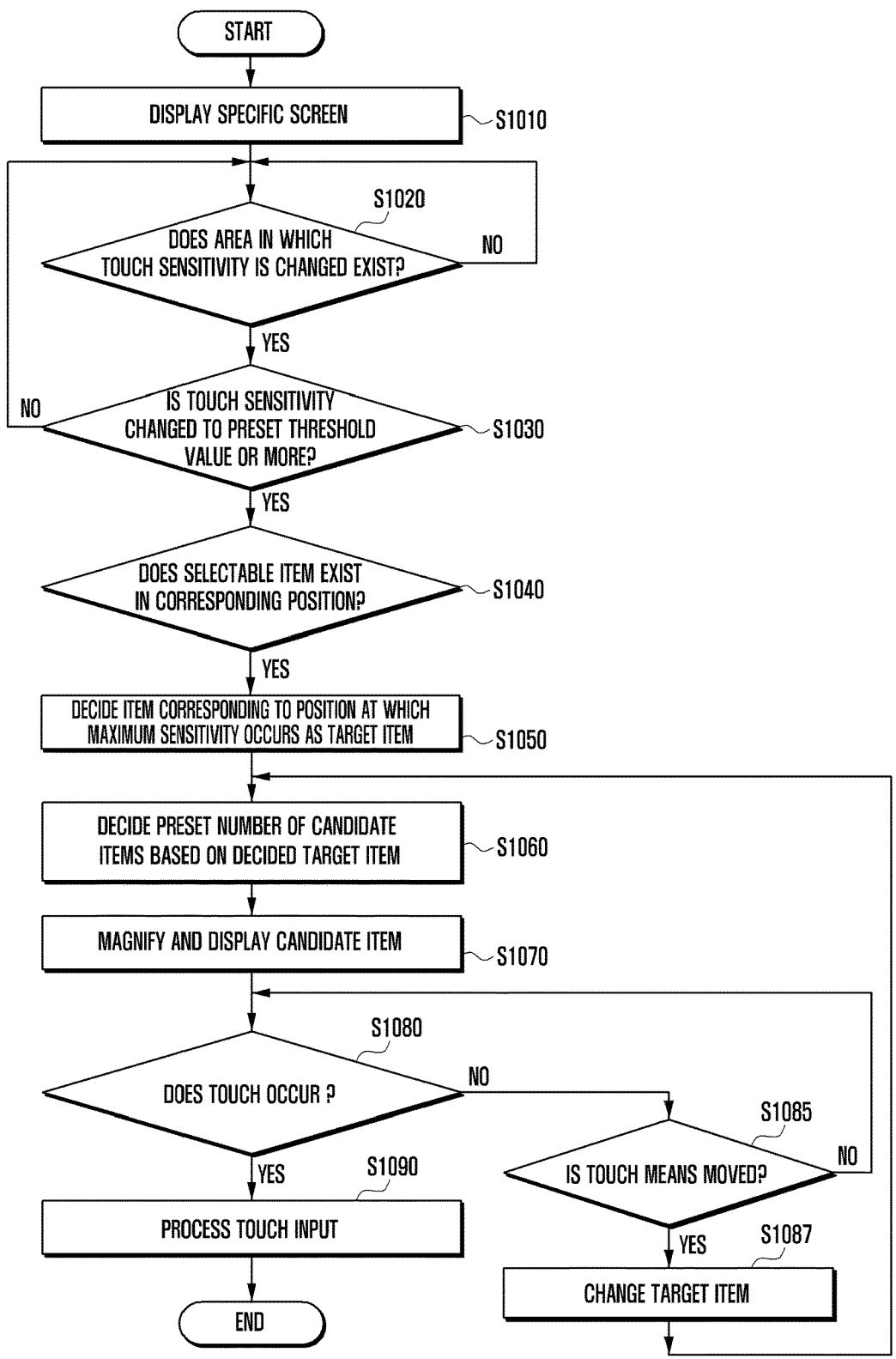
FIG. 10 is a flowchart illustrating an operation procedure of a device according to various embodiments of the present invention.

FIG. 10 is a flowchart illustrating an operation procedure of a device according to various embodiments of the present invention.

In the following description of a flow chart of FIG. 10, the description overlapped with the flow chart of FIG. 7 is omitted.

First, at step S1010, the device may display a specific screen on the touch screen. In addition, at step S1020, the device may determine whether the area in which the touch sensitivity is changed exists on the touch screen.

However, when the area in which the touch sensitivity is changed exists, the device may proceed to step S1030, and determine whether the touch sensitivity for a corresponding area is changed to a set threshold value or more.

When the touch sensitivity is changed to a set threshold value or more, the device may proceed to step S1040, and determine whether a selectable item exists in a corresponding area. The selectable item may be an item which is based on user's input, and may mean an input item of the present invention.

When the selectable item exists, the device may proceed to step S1050 and may obtain position information on a position at which maximum sensitivity occurs. In addition, the device may decide an item corresponding to the position at which the maximum sensitivity occurs as a target item.

In addition, the device may proceed to step S1060, and may decide a preset number of the candidate item based on the decided target item. In addition, the device may proceed to step S1070, and may magnify and display the candidate item decided in the previous step to a set size.

In addition, the device may proceed to step S1080 and may determine whether a touch occurs on the touch screen. When a touch occurs, the device may proceed to step S1090 and may process the touch as a touch input and process the subsequent procedure.

On the other hand, if the touch is not occurred at step S1080, the device may proceed to step S1085 and determine whether the touch means is moved. To this end, the device may determine whether the position having maximum sensitivity on the touch screen is changed.

If it is determined that the touch means is moved, the device may proceed to step S1087 and change the target item. In addition, the device may proceed to step S1060 again, and may re-determine the candidate item based on the changed target item. In addition, the device may proceed to step S1070, and may magnify and display the re-determined candidate item.

The subsequent procedure of processing the occurrence of a touch is the same as above description.

Figure 11:
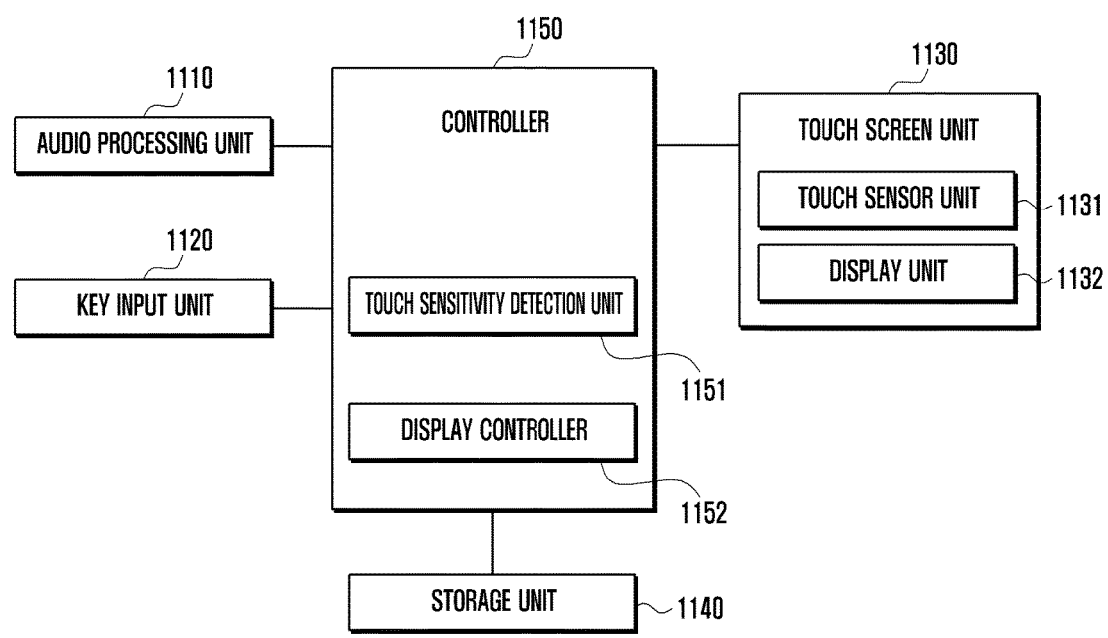
FIG. 11 is a block diagram illustrating an internal structure of a device according to an embodiment of the present invention.

FIG. 11 is a block diagram illustrating an internal structure of a device according to an embodiment of the present invention. As shown in FIG. 11, the device of the present invention may include an audio processing unit 1110, a key input unit 1120, a touch screen unit 1130, a storage unit 1140, and a controller 1150.

The audio processing unit 1110 may be configured of a codec, and the codec may be composed of a data codec to process packet data or the like and an audio codec to process an audio signal such as a voice. The audio processing unit 1110 may convert a digital audio signal into an analog audio signal through the audio codec to play through a speaker (SPK), and convert an analog audio signal input from a microphone (MIC) into a digital audio signal through the audio codec.

The key input unit 1120 may receive an input of the key operation of a user for controlling the device and generate an input signal to transmit to the controller 1150. The key input unit 1120 may be composed of a keypad including a number key and a direction key, and may be formed of a certain function key on one surface of the device. In the case of the device capable of accomplishing all operations by using only the touch screen unit 1130 according to an embodiment of the present invention, the key input unit 1120 may be omitted.

The touch screen unit 1130 may include a touch sensor unit 1131 and a display unit 1132. The touch sensor unit 1131 may detect user's touch input. The touch sensor unit 1131 may be configured of a touch sensor such as a capacitive overlay, a resistive overlay, an infrared beam, or the like, or may be configured of a pressure sensor. In addition to the above sensors, all types of sensor devices capable of sensing the touch or the pressure of an object may be configured of the touch sensor unit 1131 of the present invention. The touch sensor unit 1131 may detect the user's touch input, and generate a detection signal to transmit to the controller 1150. The detection signal may include coordinate data of a coordinate to which the user inputs the touch. When the user inputs a touch position movement operation, the touch sensor unit 1131 may generate a detection signal including the coordinate data of a touch position movement path to transmit to the controller 1150. In addition, according to an embodiment of the present invention, even before the touch is occurred, when the touch means approaches, the touch sensor unit 1131 may detect a change of the touch sensitivity which is generated according to an approach distance.

The display unit 1132 may be formed of a liquid crystal display (LCD), an organic light emitting diode (OLED), an active matrix organic light emitting diode (AMOLED), and the like, and may visually provide a menu of the device, input data, function setting information, and various other information to the user. The display 1132 may serve to output a booting screen, an idle screen, a menu screen, a call screen, and other application screen of the device.

The storage unit 1140 may serve to store a program and a data required for the operation of the device, and may be divided into a program area and a data area. The program area may store a program that controls the overall operation of the device, an operating system (OS) for booting the device, an application program necessary for playing multimedia contents, and other option function of the device, for example, an application program necessary for a camera function, a sound play function, an image or video play function, and the like. The data area is an area in which the data which is generated according to the use of the device is stored, and may store an image, a video, a phone book, an audio data, and the like.

The controller 1150 may control the overall operation of each element of the device. In particular, the controller 1150 may control a series of processes for magnifying and displaying a certain number of input items corresponding to the position having increased touch sensitivity, when the touch means approaches within a certain distance to the touch screen. To this end, the controller 1150 may further include a touch sensitivity detection unit 1151 and a display controller 1152.

The touch sensitivity detection unit 1151 may detect the approach of the touch means on the touch screen. When the touch sensitivity detection unit 1151 detects a position having a touch sensitivity which is a preset threshold value or more, the touch sensitivity detection unit 1151 may generate a detection signal related to the detection of the position to transmit to the display controller 1152.

The display controller 1152 may control to magnify and display at least one input item corresponding to the position at which the approach has been detected, among a plurality of input items displayed on the touch screen. In more detail, the display controller 1152 may determine whether a selectable input item exists in the detected position, and decide the target item based on the detected position when the selectable input item exists. In addition, the display controller 1152 may set a preset number of candidate items which are set based on the target item, and control to magnify and display the candidate item to a set size or a set magnification.

Further, the display controller 1152 may determine whether the position having a set threshold value or more is changed on the touch screen. In the case of changing, the display controller 1152 may re-decide the target item based on the changed position, and reset a preset number of candidate items based on the re-decided target item. In addition, the display controller 1152 may magnify and display the reset candidate item on the touch screen to a set magnification or a set size.

In addition, the display controller 1152 may control to change and display the input item which is magnified based on the position movement of the touch means.

It is described in the above that the controller 1150, the touch sensitivity detection unit 1151, and the display controller 1152 are configured of a separate block and perform a different function. However, it is just an example and is not necessarily limited thereto. For example, it should be noted that the function of the display controller 1152 may be performed by the controller 1150 itself.

According to the above described embodiment of the present invention may reduce the error of user's touch input.

According to an embodiment of the present invention, when the touch means approaches within a certain distance to the touch screen in the device having the touch screen, a certain number of input items, corresponding to a position at which touch sensitivity is increased, is magnified and displayed, so that the error of user's touch input may be reduced.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for displaying a screen in a device having a touch screen, the method comprising:
    detecting a position at which touch sensitivity of the touch screen is a set threshold value or more before a touch means contacts the touch screen;
    determining whether a selectable input item exists in the detected position;
    identifying a target item based on the detected position when the selectable input item exists;
    determining whether a type of the target item is a title on hyper text transfer protocol (HTTP) in a list of article titles or a character on a virtual keyboard;
    identifying a plurality of candidate items adjacent to the target item based on the type of the target item;
    magnifying the plurality of candidate items and the target item;
    displaying the plurality of candidate items and the target item;
    determining whether the position having the set threshold value or more is changed;
    when the position is changed, re-deciding the target item based on the changed position; and
    resetting the plurality of candidate items for the re-decided target item,
    wherein the identifying the plurality of candidate items comprises:
        when the type of the target item is the title on the HTTP, identifying the plurality of candidate items among items located in up and down directions from the target item; and
        when the type of the target item is the character on the virtual keyboard, identifying the plurality of candidate items from among items surrounding the target item in up, down, left, and right directions, and
    wherein a number of the plurality of candidate items for the title on the HTTP is different from a number of the plurality of candidate items for the character on the virtual keyboard.

2. The method of claim 1, wherein the displaying comprises magnifying and displaying the plurality of candidate items to a set size.

3. The method of claim 2, further comprising:
    changing and displaying an input item which is magnified based on the position movement of the touch means.

4. The method of claim 1, further comprising magnifying and displaying the reset candidate items to a set size.

5. The method of claim 1, wherein the touch means comprises a touch pen or a part of user body.

6. The method of claim 1, wherein the input item has an arbitrary area size for receiving a user input.

7. A device having a touch screen comprising:
    the touch screen configured to:
        detect an approach or a touch input of a touch means, and
        display an input item; and
    a controller configured to:
        detect a position at which touch sensitivity of the touch screen is a set threshold value or more before the touch means contacts the touch screen,
        determine whether a selectable input item exists in the detected position,
        identify a target item based on the detected position when the selectable input item exists,
        determine whether a type of the target item is a title on hyper text transfer protocol (HTTP) in a list of article titles or a character on a virtual keyboard,
        identify a plurality of candidate items adjacent to the target item based on the type of the target item,
        magnify the plurality of candidate items and the target item,
        display the plurality of candidate items and the target item,
        determine whether the position having the set threshold value or more is changed,
        when the position is changed, re-decide the target item based on the changed position, and
        reset the plurality of candidate items for the re-decided target item,
    wherein, to identify the plurality of candidate items adjacent to the target item, the controller is configured to:
        when the type of the target item is the title on the HTTP, identify the plurality of candidate items from among items located in up and down directions from the target item, and
        when the type of the target item is the character on the virtual keyboard, identify the plurality of candidate items from among items surrounding the target item in up, down, left, and right directions, and
    wherein a number of the plurality of candidate items for the title on the HTTP is different from a number of the plurality of candidate items for the character on the keyboard.

8. The device of claim 7, wherein the controller is further configured to control to magnify and display of the plurality of candidate items to a set size.

9. The device of claim 8, wherein the controller is further configured to change and display an input item which is magnified based on the position movement of the touch means.

10. The device of claim 7, wherein the controller is further configured to magnify and display the reset candidate items to a set size.

11. The device of claim 7, wherein the touch means comprises a touch pen or a part of user body.

12. The device of claim 7, wherein the input item has an arbitrary area size for receiving a user input.

* * * * *